(12) United States Patent
Fujimoto et al.

(10) Patent No.: US 10,998,145 B2
(45) Date of Patent: May 4, 2021

(54) SWITCH DEVICE FOR VEHICLE (71) Applicant: HONDA MOTOR CO., LTD., Tokyo (JP)

(72) Inventors: Takeyoshi Fujimoto, Wako (JP); Kyoko Udo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/818,546

(22) Filed: Mar. 13, 2020

(65) Prior Publication Data
US 2020/0312581 A1  Oct. 1, 2020

(30) Foreign Application Priority Data

Mar. 27, 2019 (JP) .............................. JP2019-061871

(51) Int. Cl.
*H01H 9/04* (2006.01)
*B60R 16/00* (2006.01)
*H01H 23/14* (2006.01)

(52) U.S. Cl.
CPC ............. *H01H 9/04* (2013.01); *B60R 16/005* (2013.01); *H01H 23/145* (2013.01); *H01H 2231/026* (2013.01); *H01H 2300/01* (2013.01)

(58) Field of Classification Search
CPC .. H01H 9/04; H01H 23/145; H01H 2231/026; B60R 16/005
USPC ........................................................ 200/339
See application file for complete search history.

(56) References Cited

U.S. PATENT DOCUMENTS

2008/0169657 A1\* 7/2008 Horton ................... E05B 83/30
292/220

FOREIGN PATENT DOCUMENTS

JP 2005-078852 3/2005

\* cited by examiner

*Primary Examiner* — Edwin A. Leon
*Assistant Examiner* — Iman Malakooti
(74) *Attorney, Agent, or Firm* — Rankin, Hill & Clark LLP (57) ABSTRACT

An object is to make it easy to specify, when a switch device for a vehicle gets wet, a path of liquid which attaches on the switch device. There are included: a switch member 13; a connector part 15 connected to the switch member 13; and a casing 14 enclosing the connector part 15, wherein in a state of being attached to a vehicle, an opening end part 14*d* of an outer circumferential part 14*a* of the casing 14 includes an end face 21 inclined relative to a direction of gravity G or a curved surface inclined relative to the direction of gravity.

2 Claims, 7 Drawing Sheets

SWITCH DEVICE FOR VEHICLE

CROSS-REFERENCE TO RELATED APPLICATION

The present application claims priority under 35 U.S.C. § 119 to Japanese Patent Application No. 2019-061871 filed on Mar. 27, 2019, the entire contents of which are hereby incorporated by reference.

BACKGROUND OF THE INVENTION

Field of the Invention

The present invention relates to a switch device for a vehicle.

Description of the Related Art

There is conventionally known a switch device to be attached to a vehicle which reduces the influence of liquid such as water droplets (for example, see Japanese Patent Laid-Open No. 2005-078852).

This prevents an electric short circuit by means of the internal structure of the switch device when water infiltrates inside the switch device.

However, when liquid attaches onto the surface of the switch device, it is difficult to predict which path the liquid attaching will pass through.

There are provided aspects of the present invention in view of the aforementioned circumstances, and an object is to make it easy to specify, when a switch device for a vehicle gets wet, a path of liquid which attaches on the switch device.

SUMMARY OF THE INVENTION

An aspect to solve the aforementioned problem is characterized in that there are included: a switch member; a connector part connected to the switch member; and a casing enclosing the connector part, wherein in a state of being attached to a vehicle, an opening end part of an outer circumferential part of the casing includes an inclined surface inclined relative to a direction of gravity or a curved surface inclined relative to the direction of gravity.

In the aforementioned switch device, the opening end part may include a first height position at an edge part of the opening end part, and a second height position different from the first height position, and may include the inclined surface or the curved surface crossing from the first height position to the second height position.

In the aforementioned switch device, the inclined surface or the curved surface may extend from an inside to an outside in a thickness direction of the casing, and in an opening direction of the casing.

According to a switch device for a vehicle according to an aspect of the present invention, it is easy to specify, when the switch device gets wet, a path of liquid which attaches on the switch device.

DETAILED DESCRIPTION OF THE PREFERRED EMBODIMENTS

Hereafter, embodiments according to aspects of the present invention are described with reference to the drawings. In the drawings, sign Up denotes an upward direction, and sign W1 and sign W2 denote width directions. Moreover, the up-down direction coincides with the direction of gravity G.

Figure 1:
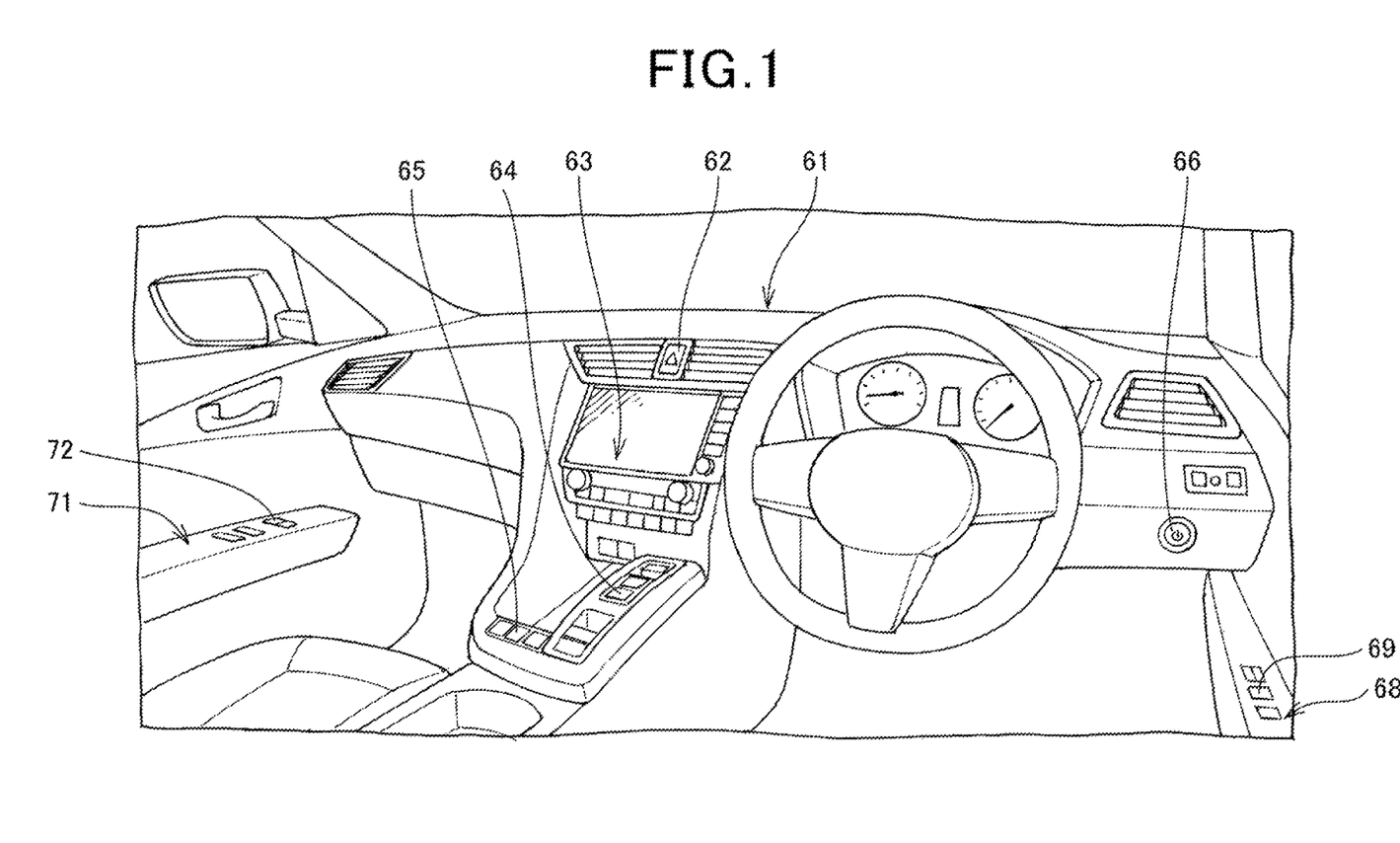
FIG. 1 is a perspective view showing the interior of a vehicle.

FIG. 1 is a perspective view showing the interior of a vehicle.

An instrument panel 61 is provided in the interior of the vehicle. Various switch devices are arranged on the instrument panel 61. A hazard lamp switch 62, an air conditioner switch 63, a shift switch 64 and a traveling mode selection switch 65 are provided from the above in the center part of the instrument panel 61. Moreover, an engine switch 66 is provided in a portion on the driver's seat side of the instrument panel 61. Furthermore, a power window switch 69 is provided on an armrest 68 of a driver's seat side door 67, and a power window switch 72 is provided on an armrest 71 of an assistant driver's seat side door 70.

The switch device 11 of the present embodiment can be applied to switches attached onto panels on horizontal planes, and can be applied to the shift switch 64, the traveling mode selection switch 65, the power window switch 69 and the power window switch 72.

Moreover, the switch device 11 of the present embodiment can be applied to switches attached onto panels on inclined planes, and can be applied to the hazard lamp switch 62, the air conditioner switch 63 and the engine switch 66.

Figure 2:
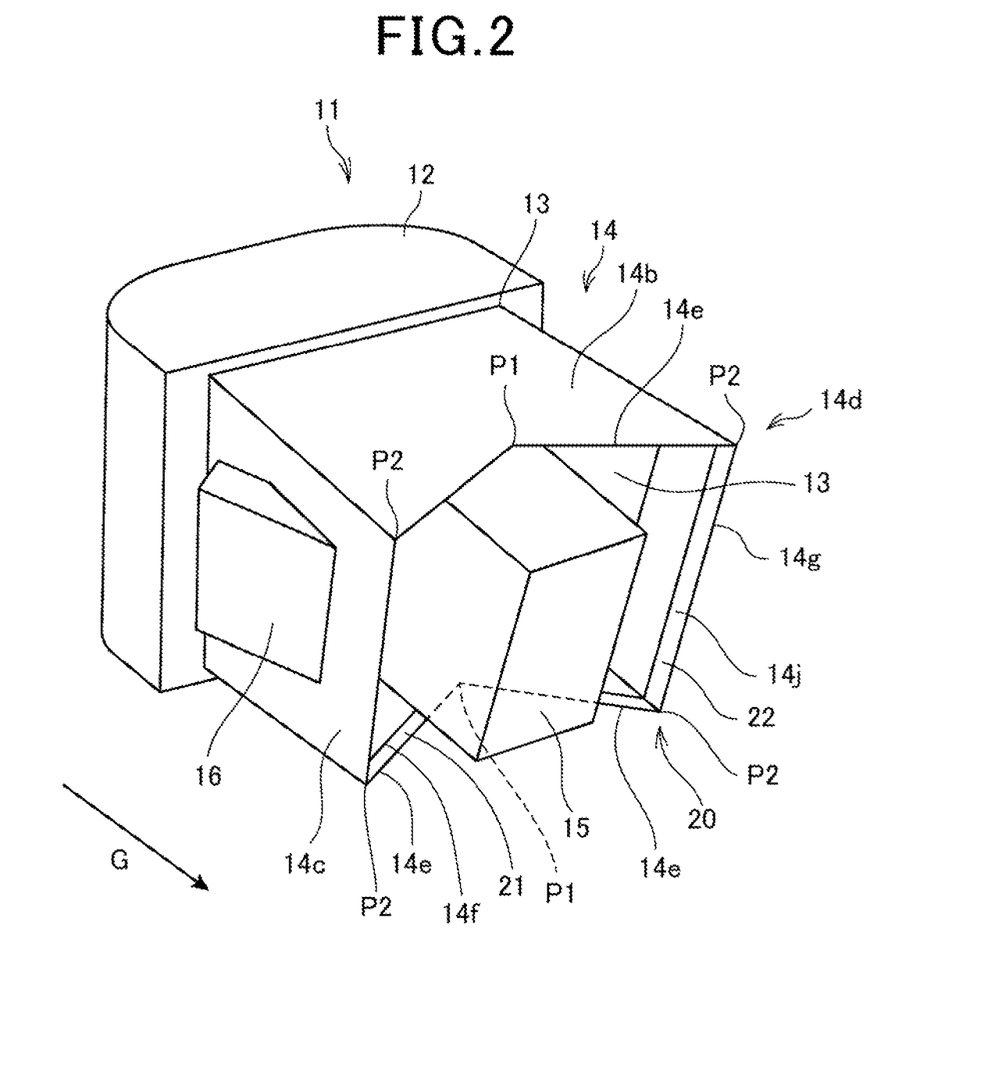
FIG. 2 is a perspective view of a switch device.
Figure 3:
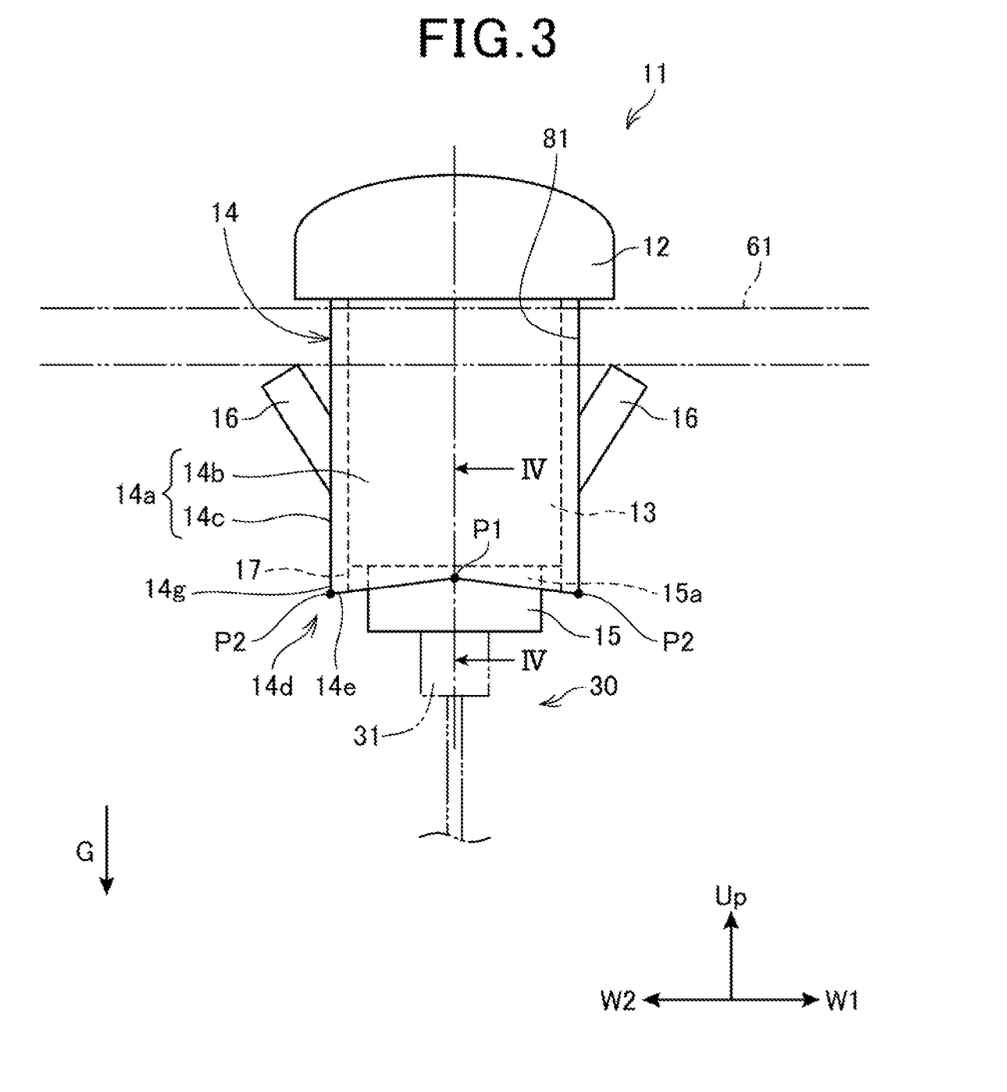
FIG. 3 is a lateral view of the switch device.
Figure 4:
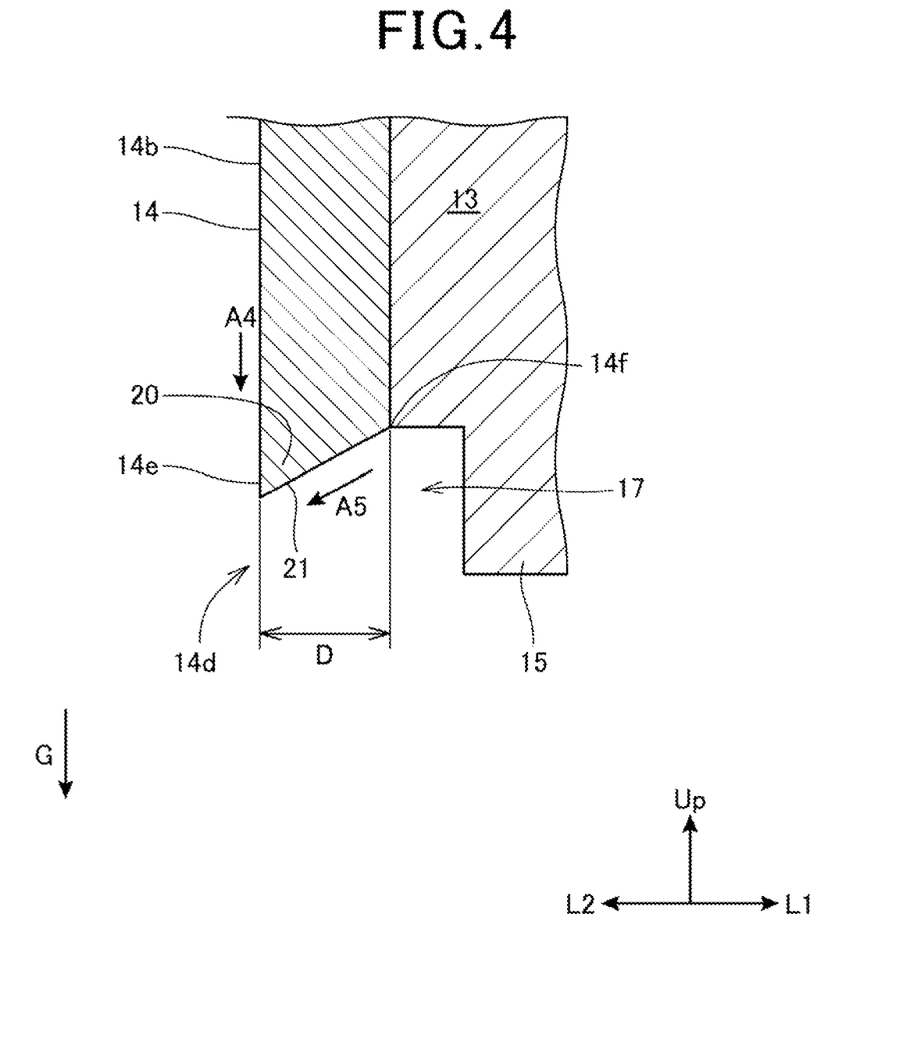
FIG. 4 is a cross-sectional view taken along the III-III line in FIG. 1.

FIG. 2 is a perspective view of the switch device 11. FIG. 3 is a lateral view showing a concept of the switch device 11. FIG. 4 is a cross-sectional view taken along the IV-IV line in FIG. 3.

As shown in FIG. 2, the switch device 11 includes an operation part 12, a switch member 13, a casing 14, a connector part 15 and fixation parts 16.

The switch member 13 is arranged inside the casing 14. The fixation parts 16 constitute a snap-in fixation member, and as shown in FIG. 3, are arranged on both sides of the casing 14. A through hole 81 is bored in the instrument panel 61, and the switch device 11 is pushed into the through hole 81 from the front surface side of the instrument panel 61. Then, the switch device 11 is fixed onto the instrument panel 61 with the pair of fixation parts 16.

A cable 30 is connected to the switch device 11. Operation on the switch device 11 is transmitted to a not-shown in-vehicle device via the cable 30.

The connector part 15 is connected to the switch member 13. The connector part 15 is formed integrally with the switch member 13.

In the present embodiment, the operation part 12 is connected to the upper part of the switch member 13, and the connector part 15 is connected to the lower part of the switch member 13.

Otherwise, the operation part 12 may be connected to the lateral part of the switch member 13, and the connector part 15 may be provided at the lower part of the switch member 13.

The cable 30 is connected to the connector part 15.

By a terminal 31 of the cable 30 being inserted into the connector part 15, the cable 30 and a not-shown electric contact of the switch member are electrically connected together. The cable 30 is connected to the not-shown in-vehicle device or the like, and operation on the switch device 11 is electrically extracted to be transmitted to the in-vehicle device or the like via the cable 30.

The casing 14 covers the switch member 13 and covers a part of the connector part 15. The switch member 13 is disposed in the casing 14, and the switch member 13 is integrally fixed to the casing 14. An outer circumferential part 14a of the casing 14 encloses the switch member 13 and encloses a connection part 15a, of the connector part 15, to the switch member 13.

The outer circumferential part 14a has an opening end part 14d at the lower end part. The outer circumferential part 14a has two outer surfaces 14b and two outer surfaces 14c. The outer surfaces 14b and the outer surfaces 14c are adjacent to each other, and the fixation parts 16 are provided on the outer surfaces 14c. The opening end part 14d is formed of the lower end parts of the outer surfaces 14b and the lower end parts of the outer surfaces 14c.

The casing 14 is formed such that the connector part 15 is inserted into the opening of the opening end part 14d. A gap 17 is formed between the connector part 15 and the casing 14.

At the opening end part 14d, the connector part 15 extends in the opening direction of the opening end part 14d. In the present embodiment, the opening end part 14d opens downward, and the connector part 15 extends downward of the switch member 13.

As shown in FIG. 3 and FIG. 4, the opening end part 14d has edge parts 14e in the lower end parts of the outer surfaces 14b and edge parts 14g on the outer surfaces 14c. The edge parts 14e are provided entirely across the outer surfaces 14b in the width direction. Each of the edge parts 14e is formed to have a reverse V-shape in which the center part in the width direction is high and the lateral parts are low. In the edge part 14e, the highest position (first height position) is a position P1 and the lowest positions (second height positions) are positions P2.

The positions P2 appear on both sides of the edge part 14e and are positioned at the same height. The edge parts 14g on the outer surfaces 14c are linear, and are formed to have a constant height.

In the edge part 14e, a shape between the position P1 and the position P2 is a linear shape inclined relative to the direction of gravity G. Liquid attaching onto the outer surface 14b of the casing 14 is to move in the direction of gravity G to be collected, along the edge part 14e, to the position P2 provided in the lateral part in the width direction.

By providing portions for collecting liquid attaching onto the casing 14 by means of the opening end part 14d as above, it becomes easy to predict paths of liquid in the case where the switch device 11 gets wet, and it becomes easy to take measures against the liquid which attaches on the switch device 11.

As shown in FIG. 4, a thick shaped part 20 is formed in the opening end part 14d of the casing 14. The thick shaped part 20 has a shape of the lower end part of the casing 14, which shape is a shape spreading toward the outside of the casing 14 toward the direction of gravity G. The thick shaped part 20 is formed by the shape of the casing 14 in the thickness direction D. The opening end part 14d of the casing 14 is formed so as to extend from the inside of the casing 14 toward the outside of the casing 14 in the direction of gravity G. The inclined surface specified by a shape between the position P1 and the position P2 extends from the inside to the outside in the thickness direction of the casing 14, and in the opening direction of the casing 14.

As shown in FIG. 4, the edge part 14e is positioned on the outer side of the lower end of the outer surface 14b, and an edge part 14f on the inner side of the lower end of the outer surface 14b is formed. An end face 21 is formed between the edge part 14e and the edge part 14f. The end face 21 is a face inclined relative to the direction of gravity G. In a lateral sectional shape of the outer surface 14b, the edge part 14e on the outer side of the lower end is positioned downward of the edge part 14f on the inner side of the lower end relative to the direction of gravity G. The lateral cross-section of the outer surface 14b herein is a cross-section along the thickness direction D of the outer surface 14c and the direction of gravity G. Thereby, the end face 21 is formed as an inclined surface on which liquid goes more apart from the connector part 15 as going more toward the direction of gravity G.

When liquid attaches onto the outer surface 14b, the liquid is going down under gravity to be collected to the outer side edge part 14e due to the shape of the end face 21.

As shown in FIG. 2, end faces 22 inclined relative to the direction of gravity G are formed also on the outer surfaces 14c. The end faces 22 are formed in the lower end parts of the outer surfaces 14c. Each of the end faces 22 is formed between an edge part 14g on the outer side of the lower end of the outer surface 14c and an edge part 14j on the inner side of the lower end of the outer surface 14c.

In a lateral sectional shape of the outer surface 14c, the edge part 14g on the outer side of the lower end is positioned downward of the edge part 14j on the inner side of the lower end relative to the direction of gravity G. The lateral cross-section of the outer surface 14c is a cross-section along the thickness direction D of the outer surface 14c and the direction of gravity G. The end face 22 is formed as an inclined surface on which liquid goes more apart from the connector part 15 as going more toward the direction of gravity G.

In the casing 14, the end faces 21 are connected to the end faces 22 to form the thick shaped part 20 in the opening end part 14d. Thus, the thick shaped part 20 has an inclined surface going from the inside to the outside in the thickness direction of the casing 14, and toward the opening direction of the opening end part 14d.

Due to this shape of the thick shaped part 20, liquid attaching onto the casing 14 is collected to the opening end part 14d and the edge parts 14e. The liquid collected to the edge parts 14e is collected, along the edge parts 14e, to the edge parts 14g. Moreover, the end faces 21 and the end faces 22 may be formed to have curved surfaces going more apart from the connector part 15 as going toward the direction of gravity G.

Also when the end faces 21 and the end faces 22 are formed to have such curved surfaces, it is difficult for liquid attaching onto the casing 14 to move to the inside of the casing 14.

When the switch device 11 attached to the instrument panel 61 gets wet, liquid attaching onto the outer surface 14b moves in the direction indicated by an arrow A4 along the outer surface 14b under gravity. Once the liquid reaches the edge part 14e, the liquid moves downward under gravity.

The edge part 14e is connected to the edge part 14g of the outer surface 14c, and the liquid which reaches the edge part 14e gathers to the edge part 14g and drops downward under gravity.

As shown in FIG. 4, when liquid infiltrate between the switch member 13 and the casing 14, it is collected to the outer side of the casing 14 due to the shape of the thick shaped part 20.

The lower end of the switch member 13 is formed to be horizontal, and the casing 14 projects downward of the switch member 13. The liquid which goes out between the switch member 13 and the casing 14 moves downward along the casing 14 under gravity. Then, it moves in the direction indicated by an arrow A5 due to the shape of the thick shaped part 20, and is collected to the outer side of the casing 14. The liquid collected to the outer side of the casing 14 gathers, along the edge part 14e, to the edge part 14g.

By setting the edge parts 14e of the outer surfaces 14b to be shapes concave upward in lateral view as above, liquid attaching onto the outer surface 14b can be put aside in the width directions. By collecting paths of liquid attaching onto the switch device 11 to parts of the casing 14, it can be easy to take measures against the liquid which attaches on the switch device 11. For example, by arranging the cable 30 away from the portions below the edge parts 14g, there can be reduced the influence of drops of the liquid on the cable 30. In addition, since a path for discharging liquid may be provided only in the portions below the edge parts 14g, discharge members for discharging water can be reduced.

Moreover, the edge parts 14e are formed across the connector part 15 in lateral view. The edge parts 14e are formed in a direction apart from the connector part 15 along the direction of gravity G. Therefore, liquid moves in the direction apart from the connector part 15 along the edge part 14e, and the influence of the liquid on the connector part 15 can be reduced.

In the aforementioned switch device 11, the shapes of the lower end parts of the outer surfaces 14c may be formed to be similar to the shapes of the lower end parts of the outer surfaces 14b. In this case, liquid attaching onto the casing 14 is collected to any of the second height positions P2 of the outer surface 14b. Liquid attaching onto the casing 14 can be collected at the four places of the casing 14, and it is easy to take measures against the liquid which attaches on the casing 14.

Next, modifications of the switch device are described.

Figure 5:
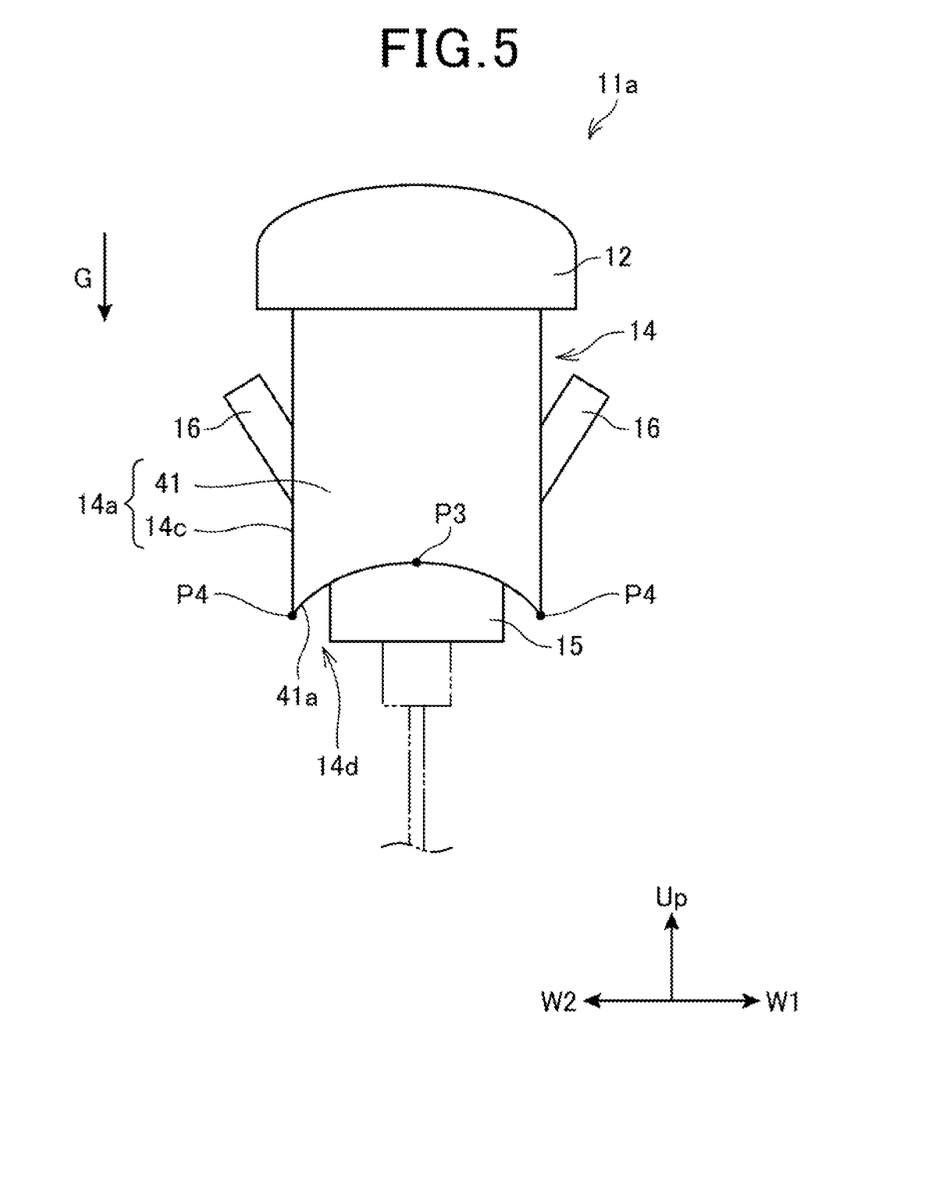
FIG. 5 is a diagram showing a switch device as a first modification.

FIG. 5 is a diagram showing a switch device 11a which is a first modification. The same portions as those in FIG. 3 are given the same signs and their description is omitted.

The switch device 11a is different from that in FIG. 3 in the shapes of the outer surfaces 14b in which the edge parts 14e are provided. The casing 14 is constituted of outer surfaces 41 and the outer surfaces 14c.

The edge parts 14g of the outer surfaces 14c and edge parts 41a of the outer surfaces 41 are connected together to form the opening end part 14d enclosing the connector part 15.

In the edge part 41a, shapes between a position (first height position) P3 and positions (second height position) P4 are curved surface shapes inclined relative to the direction of gravity G. The edge part 41a is formed so as to entirely go down from the position P3 toward any of the positions P4. Therefore, the lower end face of the edge part 41a is formed to be a curved surface inclined relative to the direction of gravity G. Liquid attaching onto the outer surface 41 is to move in the direction of gravity G to be collected, along the edge part 41a, to the position P4. The curved surface specified by a shape between the position P3 and the position P4 extends from the inside to the outside in the thickness direction of the casing 14, and in the opening direction of the casing 14.

By setting the edge parts 41a of the outer surfaces 41 to be shapes concave upward in lateral view, liquid attaching onto the outer surface 14b can be put aside in the width directions.

By collecting paths of liquid attaching onto the switch device 11 to parts of the casing 14, it can be easy to take measures against the liquid which attaches on the switch device 11a. By providing portions for collecting liquid attaching onto the casing 14 by means of the opening end part 14d enclosing the connector part 15 as above, it becomes easy to predict paths of liquid in the case where the switch device 11a gets wet, and it becomes easy to take measures against the liquid which attaches on the switch device 11a.

Figure 6:
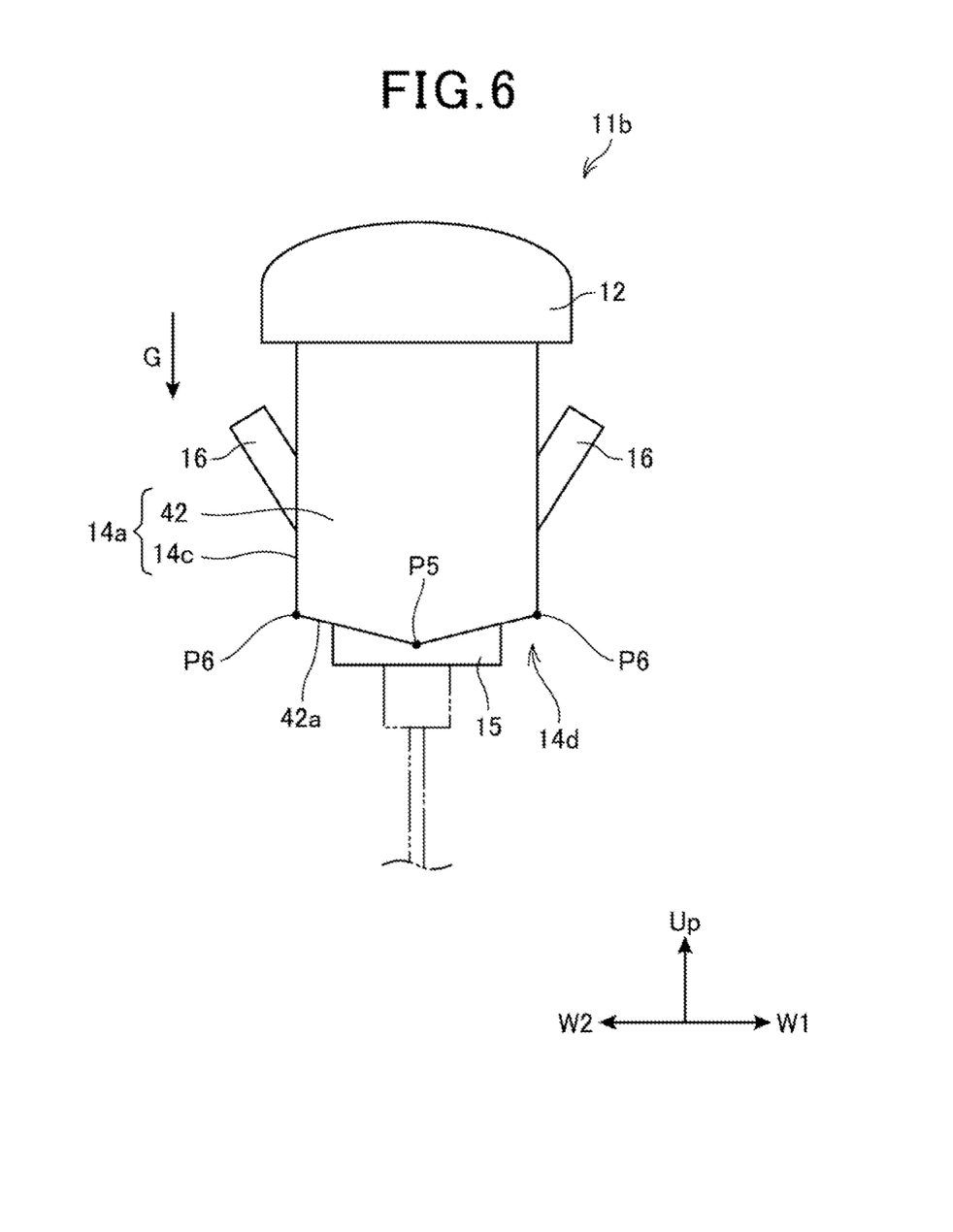
FIG. 6 is a diagram showing a switch device as a second modification.

FIG. 6 is a diagram showing a switch device 11b which is a second modification.

The switch device 11b which is the second modification is different in the shapes of the outer surfaces 14b on which the edge parts 14e are provided. The casing 14 is constituted of outer surfaces 42 and the outer surfaces 14c.

Edge parts 42a are provided in the lower end parts of the outer surfaces 42. Each of the edge parts 42a is formed to have a V-shape in which the center part in the width direction is low and the lateral parts are high. Namely, the lower end parts of the outer surfaces 42 are formed such that the center parts in the width direction are convex downward.

In the switch device 11b, the opening end part 14d enclosing the connector part 15 is formed of the edge parts 14g of the outer surfaces 14c and the edge parts 42a of the outer surfaces 42.

In the edge part 42a, the lowest position (second height position) at the center part in the width direction is a position P5. The highest positions (first height positions) at the end parts in the width direction are positions P6, and are at both end parts of the edge part 41a in the width direction. The position P5 is positioned downward of the positions P6. The edge parts 42a are connected to the edge parts 14g of the outer surfaces 14c at the positions P6.

In the edge part 42a, shapes between the position P5 and the positions P6 are formed to be linear shapes inclined relative to the direction of gravity G. The edge part 42a is formed so as to continuously go down from the positions P6 toward the position P5. Liquid attaching onto the outer surface 42 is to move in the direction of gravity G to be collected, along the edge part 42a, to the position P5. Curved surfaces between the position P5 and the positions P6 extend from the inside to the outside in the thickness direction of the casing 14, and in the opening direction of the casing 14.

By providing portions for collecting liquid attaching onto the casing 14 by means of the opening end part 14d enclosing the connector part 15, it becomes easy to predict paths of liquid in the case where the switch device 11b gets wet, and it becomes easy to take measures against the liquid which attaches on the switch device 11b.

In the lower end part of the outer surface 42, an inclined surface going more to the outer side of the casing 14 in the thickness direction as going more toward the direction of gravity G may be formed. The liquid which goes out inward of the outer surface 42 moves in a direction apart from the connector part 15 in the thickness direction of the outer surface 42. The connector part 15 and the terminal 31 are thus protected from such liquid.

Figure 7:
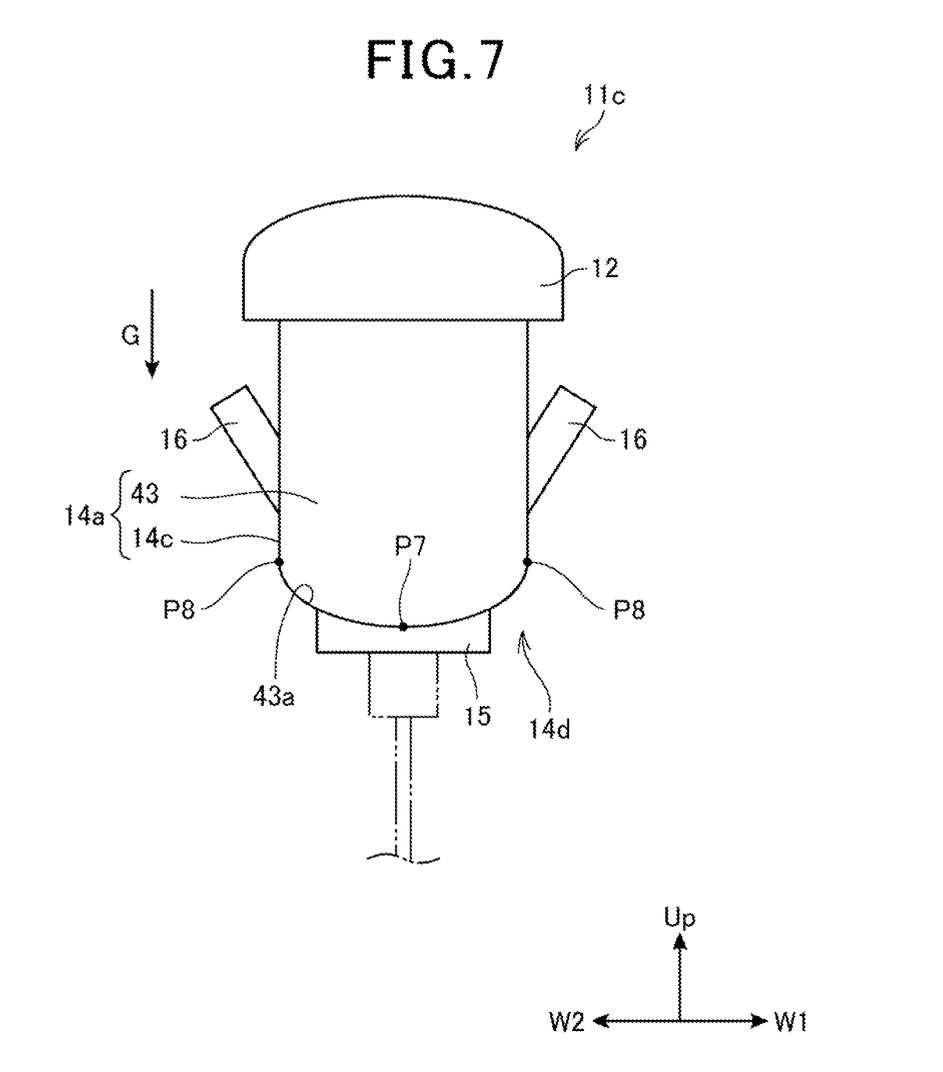
FIG. 7 is a diagram showing a switch device as a third modification.

FIG. 7 is a diagram showing a switch device 11c which is a third modification.

The switch device 11c which is the third modification is different in the shapes of the outer surfaces 14b on which the edge parts 14e are provided. The casing 14 is constituted of outer surfaces 43 and the outer surfaces 14c. Edge parts 43a are provided in the lower end parts of the outer surfaces 43. Each of the edge parts 43a is provided entirely across the outer surface 43 in the width direction. The edge part 43a is formed to have an arc shape in which the center part in the width direction is low and the lateral parts are high. The lower end parts of the outer surfaces 43 are formed such that the center parts in the width direction are convex downward.

In the switch device 11c, the opening end part 14d enclosing the connector part 15 is formed of the edge parts 14g of the outer surfaces 14c and the edge parts 43a of the outer surfaces 43.

On the edge parts 43a, the lowest position (second height position) at the center part in the width direction is a position P7. In the edge part 43a, the highest positions (first height positions) at the end parts in the width direction are positions P8, and are at both end parts of the edge part 43a in the width direction.

The positions P7 are positioned downward of the positions P8. The edge parts 43a are connected to the edge parts 14g of the outer surfaces 14c at the positions P8.

In the edge part 43a, shapes between the position P7 and the positions P8 are formed to be curved surface shapes entirely going down toward any of the positions P7 relative to the direction of gravity G. The edge part 43a is formed so as to continuously go down from the positions P8 toward the position P7. The lower end face of the edge part 43a is formed to be a curved surface inclined relative to the direction of gravity G. Liquid attaching onto the outer surface 43 is to move in the direction of gravity G to be collected, along the edge part 43a, to the position P7.

The curved surface formed between the position P7 and the position P8 extends from the inside to the outside in the thickness direction of the casing 14, and in the opening direction of the casing 14.

By setting the edge parts 43a of the outer surfaces 43 to be shapes concave downward in lateral view, liquid attaching onto the outer surface 43 can be collected to the position P7 at the center of the outer surface 43 in the width direction. By collecting paths of liquid attaching onto the switch device 11c to parts of the casing 14, it can be easy to take measures against the liquid which attaches on the switch device 11c.

By providing portions for collecting liquid attaching onto the casing 14 by means of the opening end part 14d enclosing the connector part 15, it becomes easy to predict paths of liquid in the case where the switch device 11c gets wet, and it becomes easy to take measures against the liquid which attaches on the switch device 11c.

Similarly to the aforementioned switch device 11, the thick shaped part 20 may be formed in the opening end part 14d of the casing 14. The lower end part of the outer surface 43 may form an inclined surface going more to the outer side of the casing 14 in the thickness direction as going more toward the direction of gravity G. The lower end face of the edge part 43a is formed to be a curved surface extending outward relative to the direction of gravity G. The liquid which goes out inward of the outer surface 43 moves in a direction apart from the connector part 15 in the thickness direction of the outer surface 43. The connector part 15 and the terminal 31 are thus protected from such liquid.

Since in the present embodiment, the switch device 11 has the end face 21 which is an inclined surface which is inclined at the opening end part 14d of the outer circumferential part 14a of the casing 14, or has the edge part 41a in which a curved surface which is inclined is formed, liquid attaching onto the outer circumferential part 14a of the switch device 11 flows along the end face 21 or the edge part 41a. Therefore, paths of the liquid can be specified within a certain range by restricting such paths on which the liquid flows. Thereby, the cable 30 connected to the switch device 11 can be arranged at a position without the influence of liquid.

Moreover, since the switch device 11 has the end face 21 or a curved surface crossing from the first height position P1 to the lower second height position P2, liquid attaching onto the switch device 11 moves along the edge part 14e and flows along the end face 21 or the edge part 41a. Therefore, liquid flows along the edge part 41a between the first height position P1 and the second height position P2 and does not drop from the switch device 11. Thereby, paths on which liquid flows can be specified within a certain range by restricting such paths of the liquid.

Each of the aforementioned embodiments merely represents an aspect of the present invention, and specific modes of the present invention and applications of the present invention are not limited to the aforementioned embodiments. In the aforementioned embodiments, the edge parts 14e, the edge parts 41a, the edge parts 42a and the edge parts 43a are provided on the outer surfaces facing each other in the casing 14. Meanwhile, the edge part(s) 14e, the edge part(s) 41a, the edge part(s) 42a or the edge part(s) 43a may be provided on any of one to four of the four outer surfaces of the casing 14. The casing 14 may be formed by combining any of the outer surfaces in which the edge parts 14e, the edge parts 41a, the edge parts 42a and the edge parts 43a are provided.

REFERENCE SIGNS LIST

11 Switch device
12 Operation part
13 Switch member
14 Casing
14a Outer circumferential part
14b Outer surface
14c Outer surface
14d Opening end part
14e Edge part
14f Edge part
14g Edge part
14j Edge part
15 Connector part
16 Fixation part
20 thick shaped part
21 End face
22 End face
30 Cable
31 Terminal
D Thickness direction
G Direction of gravity
P1 First height position
P2 Second height position

What is claimed is:
1. A switch device for a vehicle, comprising:
a switch member;
a connector part connected to the switch member; and
a casing enclosing the connector part, wherein
in a state of being attached to a vehicle, an opening end part of an outer circumferential part of the casing includes an inclined surface inclined relative to a direction of gravity or a curved surface inclined relative to the direction of gravity, the opening end part includes a first height position at an edge part of the opening end part, a second height position different from the first height position, and the inclined surface or the curved surface crossing from the first height position to the second height position.

2. The switch device for a vehicle according to claim 1, wherein the inclined surface or the curved surface extends from an inside to an outside in a thickness direction of the casing, and in an opening direction of the casing.

* * * * *